United States Patent
Mie et al.

(10) Patent No.: US 7,384,261 B2
(45) Date of Patent: Jun. 10, 2008

(54) MOLDING DEVICE FOR PRODUCING THERMOPLASTIC CONTAINERS

(75) Inventors: Patrick Mie, Octeville-sur-Mer (FR); Eric Lemaistre, Octeville-sur-Mer (FR); Nicolas Rousseau, Octeville-sur-Mer (FR); Pierre-François Langlois, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 188 days.

(21) Appl. No.: 10/583,251

(22) PCT Filed: Nov. 4, 2004

(86) PCT No.: PCT/FR2004/002839

§ 371 (c)(1),
(2), (4) Date: Jun. 16, 2006

(87) PCT Pub. No.: WO2005/068147

PCT Pub. Date: Jul. 28, 2005

(65) Prior Publication Data

US 2007/0190202 A1      Aug. 16, 2007

(30) Foreign Application Priority Data

Dec. 19, 2003    (FR) .................................. 03 15083

(51) Int. Cl.
*B29C 49/56*    (2006.01)

(52) U.S. Cl. ...................................... 425/540; 425/541
(58) Field of Classification Search ................ 425/540, 425/541
See application file for complete search history.

(56) References Cited

U.S. PATENT DOCUMENTS

| 3,825,396 | A | 7/1974 | Kontz |
| 4,579,519 | A | 4/1986 | Maeser et al. |
| 6,918,754 | B2 * | 7/2005 | Albrecht ..................... 425/529 |
| 2003/0138517 | A1 * | 7/2003 | Albrecht ..................... 425/541 |
| 2006/0275525 | A1 * | 12/2006 | Lemaistre et al. .......... 425/541 |

FOREIGN PATENT DOCUMENTS

| FR | 2 646 802 A | 11/1990 |
| FR | 2 653 058 A | 4/1991 |
| JP | 06-262671 A | 9/1994 |

* cited by examiner

*Primary Examiner*—Robert B. Davis
(74) *Attorney, Agent, or Firm*—Sughrue Mion, PLLC

(57) ABSTRACT

A molding device for blow molding recipients made of a thermoplastic material, including a mold having two mold halves which are movable with respect to each other and provided with a locking device extending along the total height of the mold halves and including two respective hooks, which are oriented toward each other, two respective recesses adjacent to the hooks and a rotatable gib adjacent to the hook and interacting with the other hook in such a way that the two mold-halves are locked in the closed position thereof or are released from each other, the gib being inserted into the recess.

10 Claims, 6 Drawing Sheets

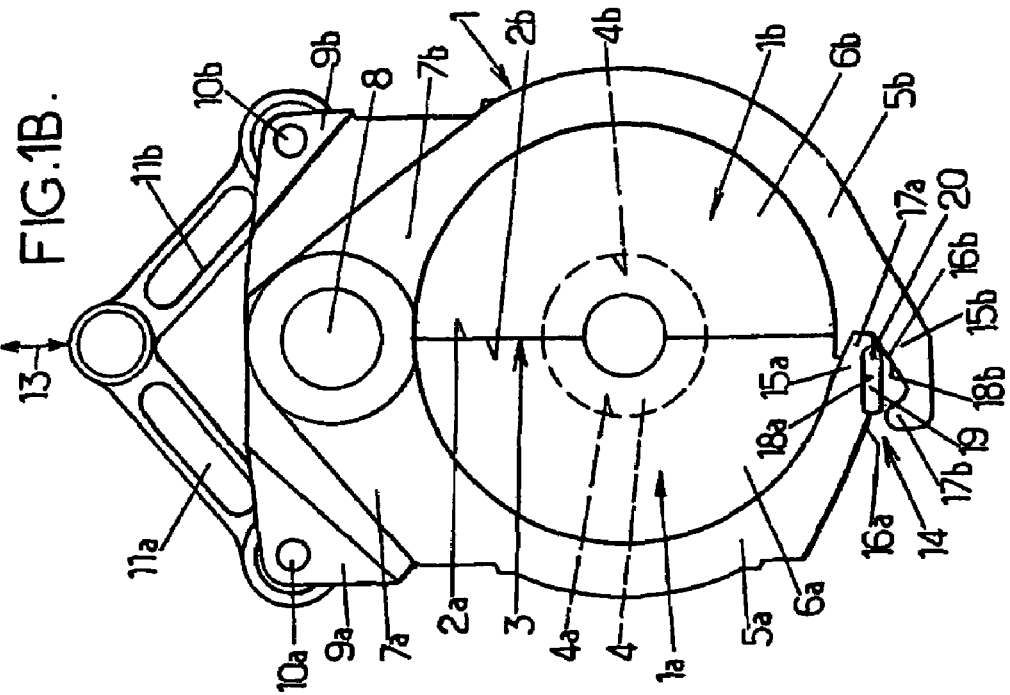
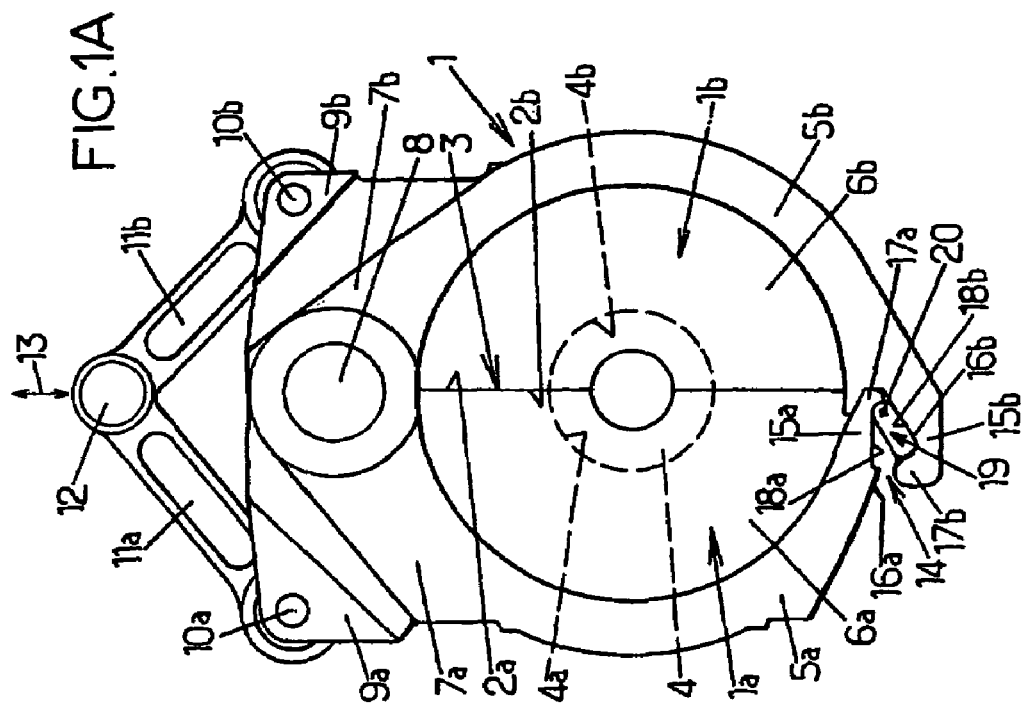

US 7,384,261 B2

MOLDING DEVICE FOR PRODUCING THERMOPLASTIC CONTAINERS

FIELD OF THE INVENTION

The present invention generally relates to the field of molding devices for producing containers by blow molding or stretch blow molding from preforms made of a heated thermoplastic.

More particularly, the invention relates to improvements made to those devices comprising at least one mold consisting of at least two half-molds, mutually displaceable between an open position in which they are separated from one another and a closed position in which they are tightly pressed against one another by respective mating bearing faces defining a parting line, the two half-molds having at least two respective corresponding edges of their respective bearing faces which are designed in the form of two mutually overlapping edges with radially opposing respective mating faces, in the closed position of the mold, locking means being functionally associated with said overlapping edges.

DESCRIPTION OF THE PRIOR ART

Locking means for two half-molds in the closed position are known from the document FR-A-2 646 802, which consist of a plurality of coupling fingers supported coaxially one above the other by a first half-mold and capable of being displaced parallel to the axis of the mold in order to engage in a plurality of respective receiving apertures supported by the second half-mold.

Such locking means prove to be satisfactory and nowadays are commonly used in molding devices with so-called "jackknife" molds.

Nevertheless, these locking means have several significant drawbacks.

One drawback is that the fingers and receiving apertures are supported in a cantilevered manner by the first and second half-molds, respectively. During the application of the blow molding pressure (for example typically in the order of 40×10$^5$ Pa), the supports of these radially projecting fingers and receiving apertures are subjected to a substantially tangential force on the periphery of the mold. To avoid deformation or tearing thereof, it is necessary for these supports to be in solid form, which increases the weight of the half-molds and also their cost.

A further drawback is in the cantilevered structure of each finger, of which the base is fitted into a radially projecting support attached to a half-mold whilst, in the locked position, the free end of the finger is retained in a corresponding receiving aperture of a radially projecting support attached to the other half-mold. Under the influence of the blowing force, each finger is subjected to bending/shear stress which, in turn, requires each finger to be in solid form and therefore heavy and costly.

All these requirements lead to the locking means substantially projecting over the periphery of the mold, whilst in equipment comprising a large number of molds and functioning at high speed (rotational molding devices of the carousel type), the available space is very limited. Moreover, these locking means are heavy and increase the inertia of the half-molds, which is detrimental for equipment which functions with fast throughput.

Finally, it will be emphasized that the method of locking/unlocking by axial displacement of a plurality of superposed ("in-line") fingers involves a relatively long operation for the portion of each finger engaged in its corresponding aperture to be sufficiently long and to produce appropriate mechanical resistance: it is noteworthy that it is therefore only possible to provide a limited number of fingers and apertures which are axially spaced apart from one another. This eventually results in a non uniform distribution of the forces over the height of the mold.

SUMMARY OF THE INVENTION

There is therefore a constant demand for molds of simplified structure, which are less cumbersome, lighter, simpler and less expensive, this demand being made more acute by the desire for increased production throughput which requires devices which function more rapidly with low inertia.

To these ends, the invention proposes a molding device as mentioned in the preamble which, being designed in accordance with the invention, is characterized in that the locking means are designed in the following manner:

- one of said overlapping edges located on the inside has a mating face (internal mating face) which terminates in a hook and which has a recess adjacent to the hook;
- the other of said overlapping edges located on the outside has a mating face (external mating face) which terminates in a hook and which has a recess adjacent to the hook;
- said respective hooks and recesses of said internal and external overlapping edges extend substantially over the entire height of the mold;
- a gib extending substantially over the entire height of the mold is mounted rotatably about a pin corresponding to one of its edges in one of said recesses and in contact with the respective hook; and
- drive means are functionally associated with said gib for pivoting about its pin between two extreme positions, whereby the gib may occupy two functional positions, namely:

- a position inserted into its mounting recess in which the gib does not engage the opposing recess of the other overlapping edge and allows a mutual relative displacement of the two half-molds (opening and closing of the mold); and
- a projecting position in which the gib is pivoted toward the outside of its mounting recess and the two half-molds being in the closed position engages in the opposing recess of the other overlapping edge such that, when the two half-molds are subjected to forces separating them from one another (pre-blow molding, blow molding), said gib is engaged with the two respective hooks of the two overlapping edges and mechanically holds the two half-molds.

Due to the arrangements of the invention, locking means for the two half-molds in the closed position are formed such that the forces separating these half-molds during certain steps (pre-blow molding, blow molding) are uniformly absorbed over the entire height of the mold. Moreover, the locking and unlocking processes of the mold obtained by rotating a rotatable gib about one of its edges are obtained by relatively small angles of rotation of the gib, for example in the order of 20°: such a rotation of relatively low angular amplitude may be carried out relatively rapidly. This rapidity of the locking and unlocking processes is completely incorporated within the scope of the functioning constraints desired by users of equipment for producing thermoplastic containers by blow molding or stretch blow molding, for which even faster production throughput is required. Moreover, emphasis is given to the structural simplicity of the locking means proposed according to the invention which comprise only a single mobile part which is, naturally, high (i.e. the height of the mold), but of low thickness and relatively narrow width. As a result, the gib has relatively low inertia during rotation which, in turn, moves in a direction allowing increased throughput. Finally, designing the half-molds for the structural and functional layout of the gib does not require substantial additions of material, such that the inertia of the mobile half-molds is also substantially reduced relative to the previous solutions. Generally, the assembly of locking means designed according to the invention allows a significant increase to be considered in the functioning speed of the mold during the closing/locking and unlocking/opening phases, at the same time that the weight of the peripheral elements (pins, supports, etc.) may also be reduced.

It is apparent that the arrangements according to the invention, although able to be applied to any type of mold, have a particular importance when the mold is of the jackknife type with the two half-molds mutually articulated in rotation on a shaft substantially parallel to one side of the joint plane: in this case, the aforementioned locking means are provided on the side of the mold opposing said shaft of the two half-molds.

In a known arrangement of the mold, each half-mold comprises a mold carrier to which is fixed internally a shell provided with a mold half-impression, the joint plane being defined by the two shells pressed against one another in the closed position of the mold: in this case, it is advantageous if the locking means are supported by the two mold carriers.

In a preferred embodiment, as the design of the drive means of the gib may be simplified, the gib is supported by the aforementioned internal overlapping edge.

In a possible embodiment, the respective hooks of said two overlapping edges and the gib extend continuously, substantially over the entire height of the mold. However, in a further embodiment which is interesting because of the weight reduction (and therefore the resulting reduction in inertia), it may be provided that the gib and at least the hook of the opposing overlapping edge extend discontinuously, substantially over the entire height of the mold.

In a particularly preferred embodiment, the gib is supported in rotation, on or by its pin, with radial play. Due to this arrangement, when the two half-molds are subjected to forces separating them from one another, it is the gib itself which is pressed against the faces of the aforementioned hooks, so that its pivot pin does not transmit any force. This pin is solely intended to retain the gib on the corresponding half-mold and it may therefore be of minimal dimensions, again with a reduction in weight.

The arrangements according to the invention have a particular application in equipment for mass production comprising a molding device of the carousel type which is mobile in rotation, generally provided with a plurality of molds distributed along the periphery. In this case, in the molding device designed according to the aforementioned arrangements, it may be provided that the drive means functionally associated with the gib consist of at least one idler roller supported, by means of a return mechanism, by one end of a rotating shaft of the gib, said roller being capable of cooperating with a fixed guide cam arranged laterally on the rotating carousel. Interestingly, therefore, the drive means of the gib consist of a return spring capable of returning the gib into its aforementioned inserted position or even, in a preferred variant, into its aforementioned projecting position.

BRIEF DESCRIPTION OF THE DRAWINGS

The invention will be more clearly understood on reading the detailed description which follows of certain preferred embodiments given solely by way of illustrative example. In this description, reference is made to the accompanying drawings, in which:

FIGS. 1A, 1B and 1C are very schematic views from above of a jackknife mold designed according to the invention and shown in three respective different functional positions (closed and locked mold, closed and unlocked mold, open mold, respectively);

DETAILED DESCRIPTION OF THE INVENTION

The arrangements according to the invention are improvements made to the molding devices for producing containers, such as bottles, by blow molding or stretch blow molding, from preforms made of a heated thermoplastic (for example PET). Such a molding device comprises at least one mold consisting of at least two half-molds (possibly a third part forms an axially displaceable mold base) which are mutually displaceable between an open position in which they are separated from one another and a closed position in which they are tightly pressed against one another by respective mating faces defining a joint plane, locking means being provided to lock the two half-molds in the closed position and to prevent their separation or partial opening when the blow molding fluid is introduced under very high pressure (for example typically in the order of $40 \times 10^5$ Pa).

Currently, such molding devices may comprise a plurality of molds and may therefore be designed in the form of a rotating device or carousel with the molds distributed over the periphery, the various functions of opening/closing, locking/unlocking, etc., of the molds able to be controlled sequentially during rotation by cam followers carried by the molds and cooperating with guide cams mounted fixed to the exterior of the rotating part.

Although the arrangements according to the invention may be applied to any type of mold, they are applied particularly to molds provided with two half-molds, rotating relative to one another or jackknife molds, which are currently very common, and it is therefore within the scope of a jackknife mold that the arrangements of the invention will be explained in detail without the protection being limited to this single type of mold.

Figure 1C:
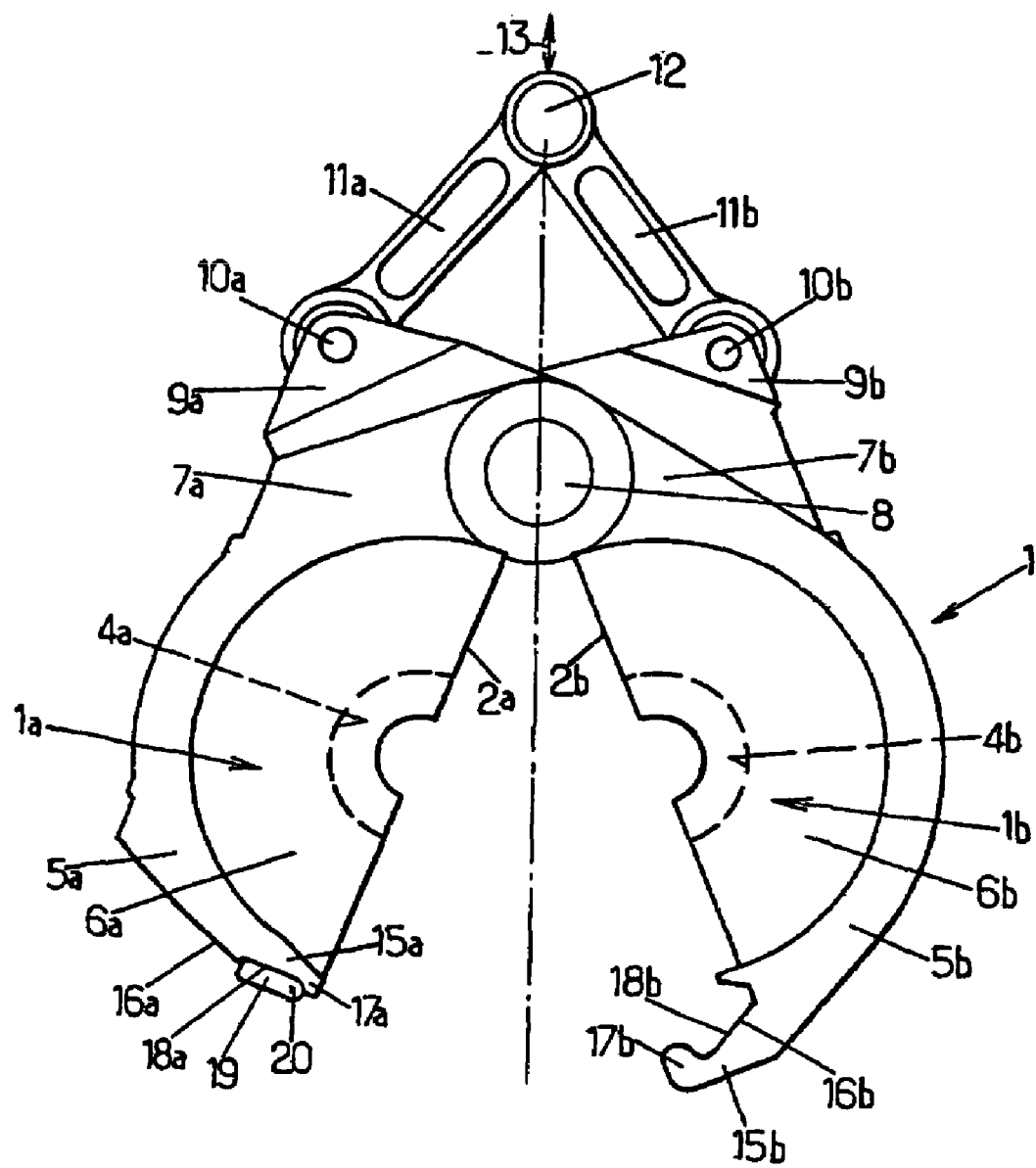

The general arrangement of a jackknife mold, denoted in its entirety by the reference numeral 1, consisting of two half-molds 1a and 1b (an axially mobile base—not shown—also able to be provided on the base of the mold) is illustrated in a simplified manner in FIGS. 1A to 1C, in a view from above. The two half-molds have two respective mating faces or bearing faces 2a, 2b which, in the closed position, define a joint plane 3 (FIGS. 1A, 1B). The mating faces are recessed with two respective half-impressions 4a, 4b which together define the molding volume 4, having the external shape of the container to be obtained or at least a large proportion of this shape with the exception of its base.

In the example illustrated more particularly in FIGS. 1A to 1C, each half-mold 1a, 1b has a composite structure and consists of at least one external armature or mold carrier 5a, 5b, and an internal mold part or shell 6a, 6b, which is removably fixed in the respective mold carrier and which comprises the aforementioned respective half-impression 4a, 4b. The shells themselves may be in two parts: the shell itself with the half-impression and a shell carrier interposed between the shell and the respective mold carrier, as disclosed in the document EP 0 821 641 in the name of the applicant.

By way of a preferred example, if it refers to a mold of the jackknife type, the half-molds 1a, 1b (in this case, the mold carriers 5a, 5b) comprise on the one hand respective projecting cheeks 7a, 7b, which are fitted between one another in a superposed manner and which are penetrated by a shaft 8 arranged in the extension of the joint plane.

Moreover, two respective projecting lugs 9a, 9b support in rotation, by means of pins 10a, 10b spaced on either side of the shaft 8, the ends of two actuating link rods 11a, 11b of which the two other respective ends are brought together in free rotation on a shaft 12 which may be displaced linearly (arrow 13), in the direction of the axis 8 to close the mold or in the opposite direction to open the mold, by drive means not shown.

On the other side of the joint plane 3 and opposite the shaft 8 are provided locking means 14 designed to maintain the two half-molds 1a, 1b in the closed position during the application of pre-blow molding and/or blow molding pressure.

The locking means 14 are designed in the following manner.

Opposing the shaft 8 bringing the two half-molds 1a, 1b together, the two respective edges of the two half-molds which border their respective bearing faces 2a, 2b are made in the shape of two mutually overlapping edges 15a, 15b which have respective mating faces radially arranged opposite one another, in the closed position of the mold shown in FIG. 1A.

In the example shown, one of said overlapping edges, for example the edge 15a of the half-mold 1a, does not extend circumferentially beyond the bearing face 2a and has a mating face 16a which terminates in the shape of a hook 17a turned toward the outside; moreover, the face 16a is hollowed out by a recess 18a adjacent to the hook 17a.

The other edge 15b of said edges extends beyond the bearing face 2b and is radially offset toward the outside such that in the closed position, illustrated in FIG. 1A, the edge 15b externally covers the edge 15a and such that the mating face 16b is located on the outside (external mating face) opposite the mating face 16a located on the inside (internal mating face).

The external mating face 16b is designed in a substantially similar manner to the face 16a. The face 16b terminates in the shape of a hook 17b turned toward the inside, beyond the hook 17a, and is hollowed out by a recess 18b adjacent to the hook 17b.

The two opposing mating faces 16a, 16b, profiled with the respective two hooks 17a, 17b and the two recesses 18a, 18b, extend substantially over the entire height of the mold.

The two hooks 17a, 17b are, in the closed position of the mold shown in FIG. 1A, offset circumferentially relative to one another by being angularly spaced apart from one another and the faces 16a, 16b are then located opposite one another.

A gib 19, also extending substantially over the entire height of the mold, is rotatably supported, by a pin 20 coinciding substantially with one of its vertical edges, by one of the edges 15a, 15b so that it is engaged between the two hooks 17a, 17b in the closed position of the mold.

The gib 19 could be supported equally well by one or other of said edges 15a, 15b in order to obtain the desired locking function. Nevertheless, as the edge 15a is radially closer to the rotating shaft 8 of the half-molds 1a, 1b, it is apparent that the inertia will be reduced by mounting the gib 19 on the edge 15a. Moreover, it is apparent that the rotating drive means of the gib, which is the subject of discussion, are able to be made more simply if the gib is attached to the edge 15a.

In these circumstances, the gib 19 is, as illustrated in FIG. 1A, mounted on the edge 15a such that the longitudinal edge of the gib to which the rotary pin 20 is associated is engaged in contact with the hook 17a, the mating faces of the gib 19 and the hook 17a being rounded.

Finally, drive means (of which an embodiment will be shown below) allow the gib 19 to pivot about its pin 20, over a predetermined angular range, between two extreme functional positions, namely:

an inserted position (shown in FIG. 1B) in which the gib 19 is inserted into the recess 18a (in which it is articulated), the configuration thereof being such that the gib 19 does not then engage the other overlapping edge 15b, more specifically the other hook 17b of this other edge 15b, and allows a mutual relative displacement of the two half-molds (opening of the mold as illustrated in FIG. 1C and closing of the mold); and a projecting or pivoted position (shown in FIG. 1A) in which the gib 19 is pivoted toward the outside and—the two half-molds 1a, 1b being in the closed position—engages in the recess 18b of the other overlapping edge 15b, such that when the two half-molds 1a, 1b are subjected to forces separating them from one another (blow molding step and/or pre-blow molding step) the gib 19 is engaged between the two respective hooks 17a, 17b and mechanically holds the two half-molds 1a, 1b.

It will be emphasized here that in the case described above and illustrated in FIGS. 1A to 1C where the half-molds 1a, 1b are designed with respective mold carriers 5a, 5b, the overlapping edges 1a, 1b belong respectively to the two mold carriers 5a, 5b.

It will also be emphasized that in FIGS. 1A to 1C, the overlapping edges 15a, 15b have been illustrated in the form of profiled ends integral with the mold carriers 5a, 5b; but it could be considered to make said overlapping edges or one thereof 15a and/or 15b, in the form of separate profiled parts, attached (in particular by a nut-and-bolt connection) to the respective mold carriers.

The arrangement of the locking means according to the invention is particularly advantageous, not only because it is simple (few component parts, little machining) and it provides particularly efficient locking of the half-molds in the closed position, but also because of the relatively low angular travel (which may, for example, be in the order of 20°) of the gib 19 between its two extreme functional positions. This low angular travel is translated by rapid locking/unlocking which contributes (in conjunction with other arrangements) to allow the functioning rates to be increased.

A particularly important preferred embodiment (which it is not possible to illustrate due to the dimensions used which are too small) consists in the gib 19 being supported in rotation by the overlapping edge 15a, with radial play (for example the far ends of the pin of the gib are engaged with radial play in the support bearings provided in the overlapping edge 15a). Thus, when the half-molds 1a, 1b are subjected to forces separating them from one another, the gib 19 may freely bear against the hook 17a: the absorption of forces is then made by relatively large bearing surfaces, with lower pressure, and the pin 20 (or the ends of this pin) is not subjected to any shear force and may have smaller dimensions (saving material, reducing weight and therefore inertia).

Figure 2A:
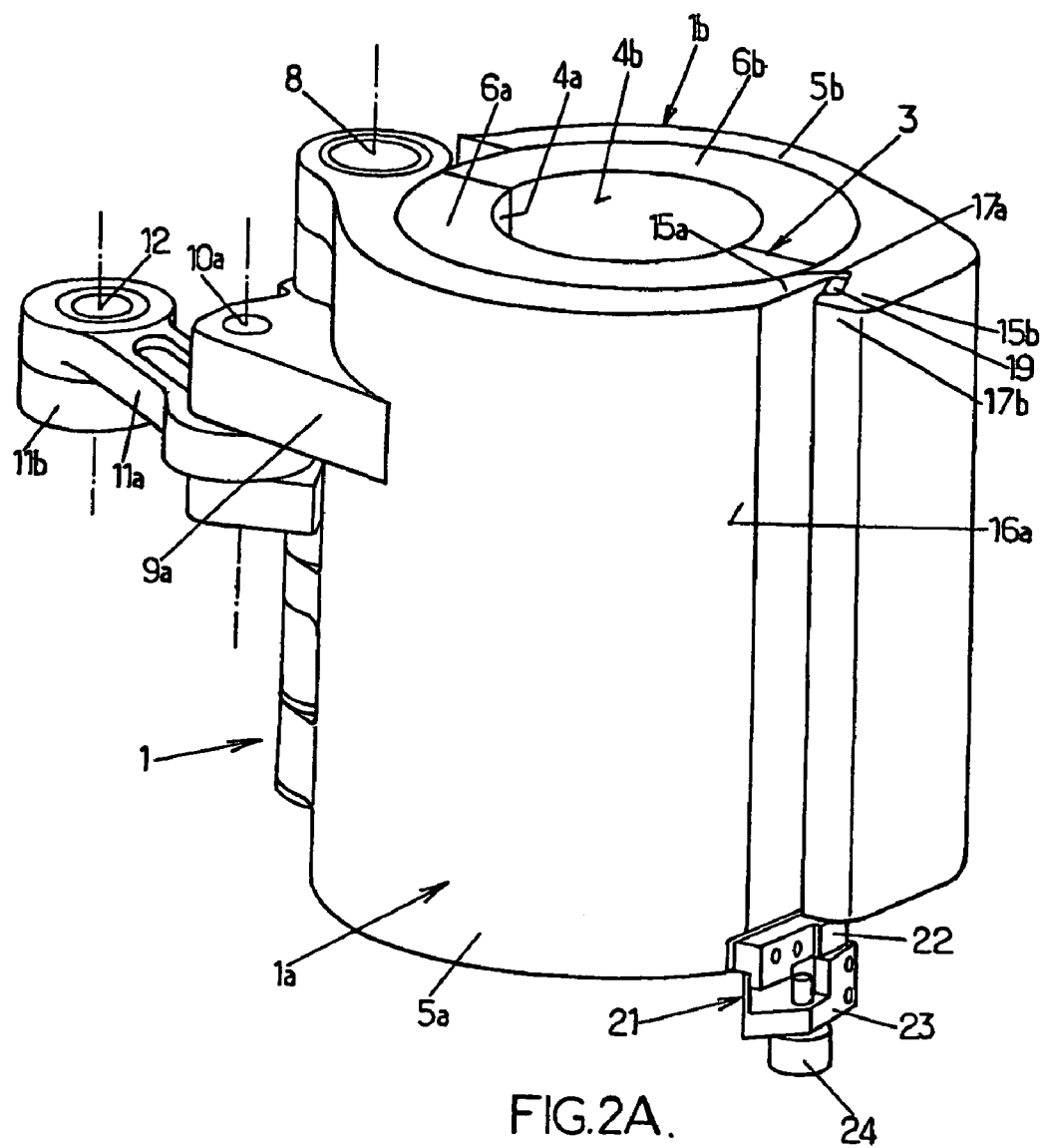
FIGS. 2A and 2B are perspective views, respectively in closed and open positions, of a concrete embodiment of a mold designed according to the invention, the mold being shown, in FIG. 2A, in section and only its lower part being illustrated and, in FIG. 2B, the gib being in vertical section so as to make the arrangement thereof visible.
Figure 2B:
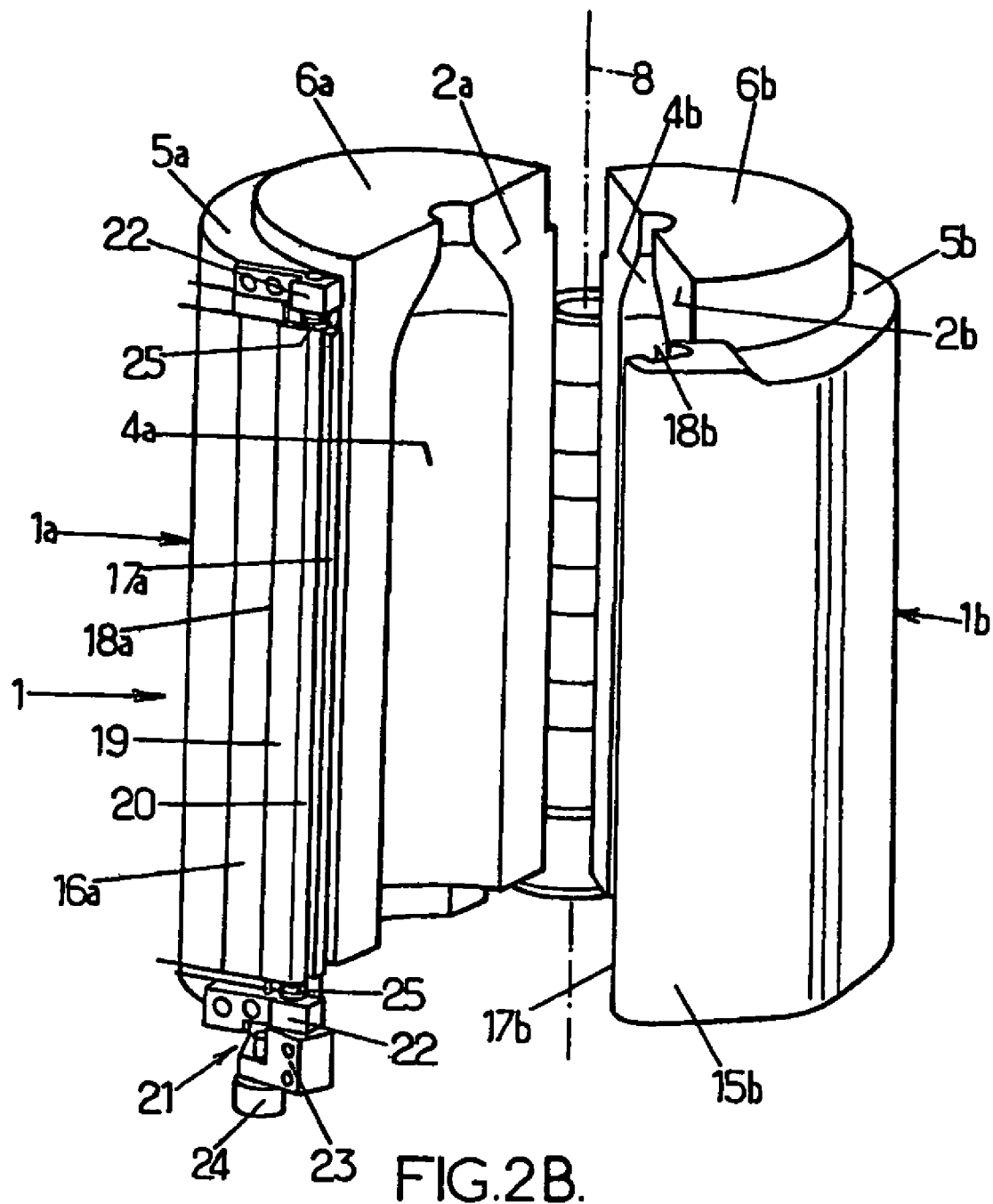

FIGS. 2A and 2B show a view, in two different respective functional positions—respectively closed and open—of a concrete embodiment of a mold, shown in perspective, designed according to the invention (the reference numerals of FIGS. 1A to 1C being repeated in FIGS. 2A and 2B).

In this embodiment, the respective hooks 17a, 17b of the two overlapping edges 15a, 15b and the gib 19 extend continuously, substantially over the entire height of the mold 1.

FIGS. 2A, 2B also show an embodiment of the rotating drive means 21 of the gib 19, capable of being implemented where the mold 1 is mounted on a rotating carousel. FIG. 2B (mold in the open position) shows the manner in which the gib 19 is mounted and, more specifically, the manner in which the ends of its rotary pin 20, projecting beyond the ends of the gib 19, pivot in bearings 22 attached to the half-mold 1a. The lower end of the pin 20, passing through the lower bearing 22, is attached to a radial arm 23 of which the free end supports an idler roller 24. This roller 24 is able to cooperate with a fixed cam (not shown) attached to the frame of the machine, which extends along the trajectory followed by the roller 24 during the rotation of the carousel supporting the mold 1.

In a possible implementation, driving the gib 19 in rotation by means of the roller/cam causes the mold to be locked in the closed position whilst, for unlocking, the gib is rotated in the opposite direction by the action of return springs 25.

In a preferred variant, driving the gib 19 in rotation by means of the roller/cam causes the mold to be unlocked in the open position whilst, for locking, the gib is rotated in the opposite direction by the action of return springs 25.

Figure 3:
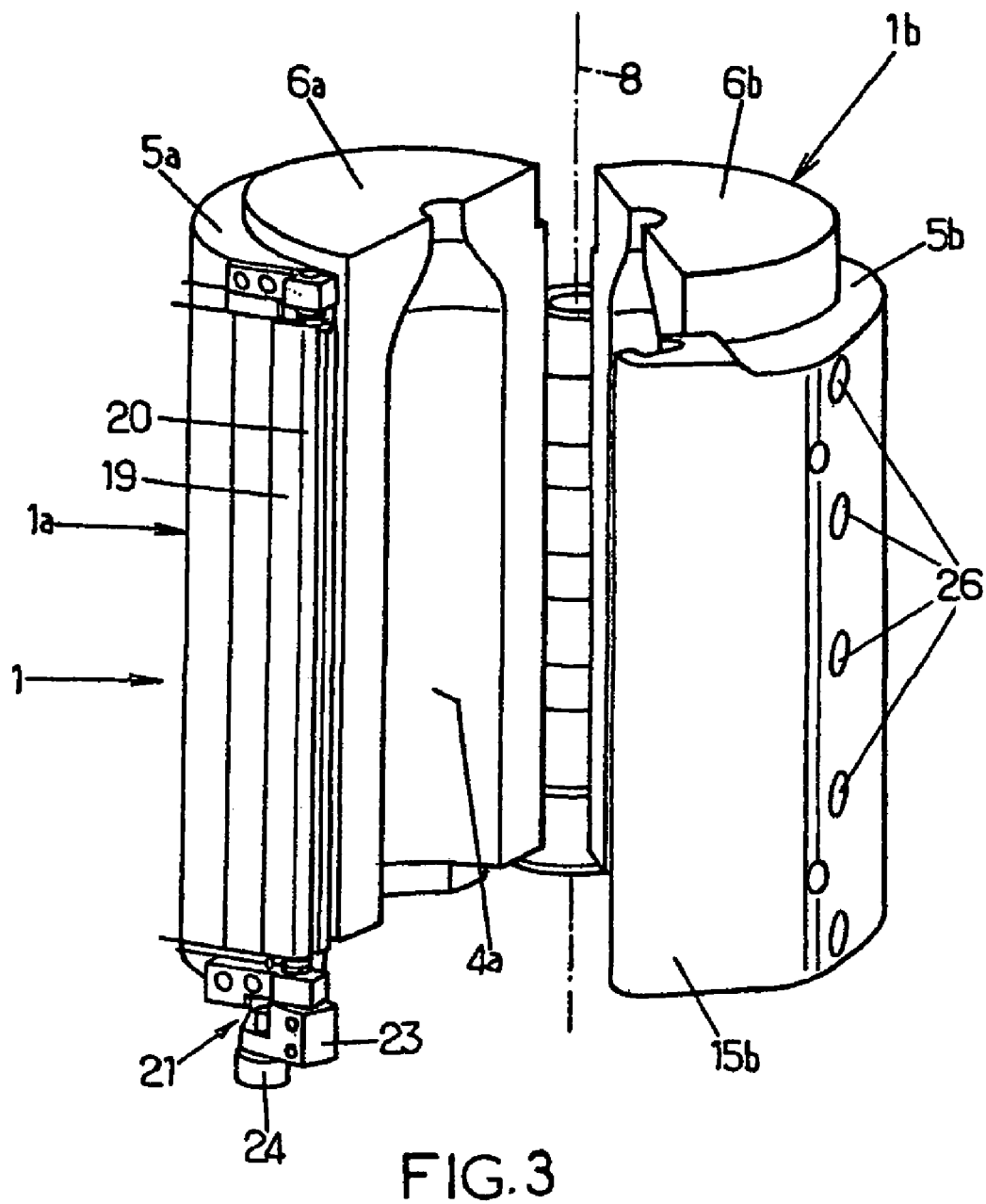
FIG. 3 is a similar view to that of FIG. 2B, showing a variant of the mold.

FIG. 3 is a view similar to that of FIG. 2B (mold in the open position) showing a variant according to which the overlapping edge 15b, which is located radially on the outside in the closed position of the mold, is constituted in the form of a separate part, attached to the mold carrier 5b. In the example shown, this part is fixed by a nut-and-bolt connection with tangential bolts of which only the apertures 26 of the tangential housings are visible.

Figure 4:
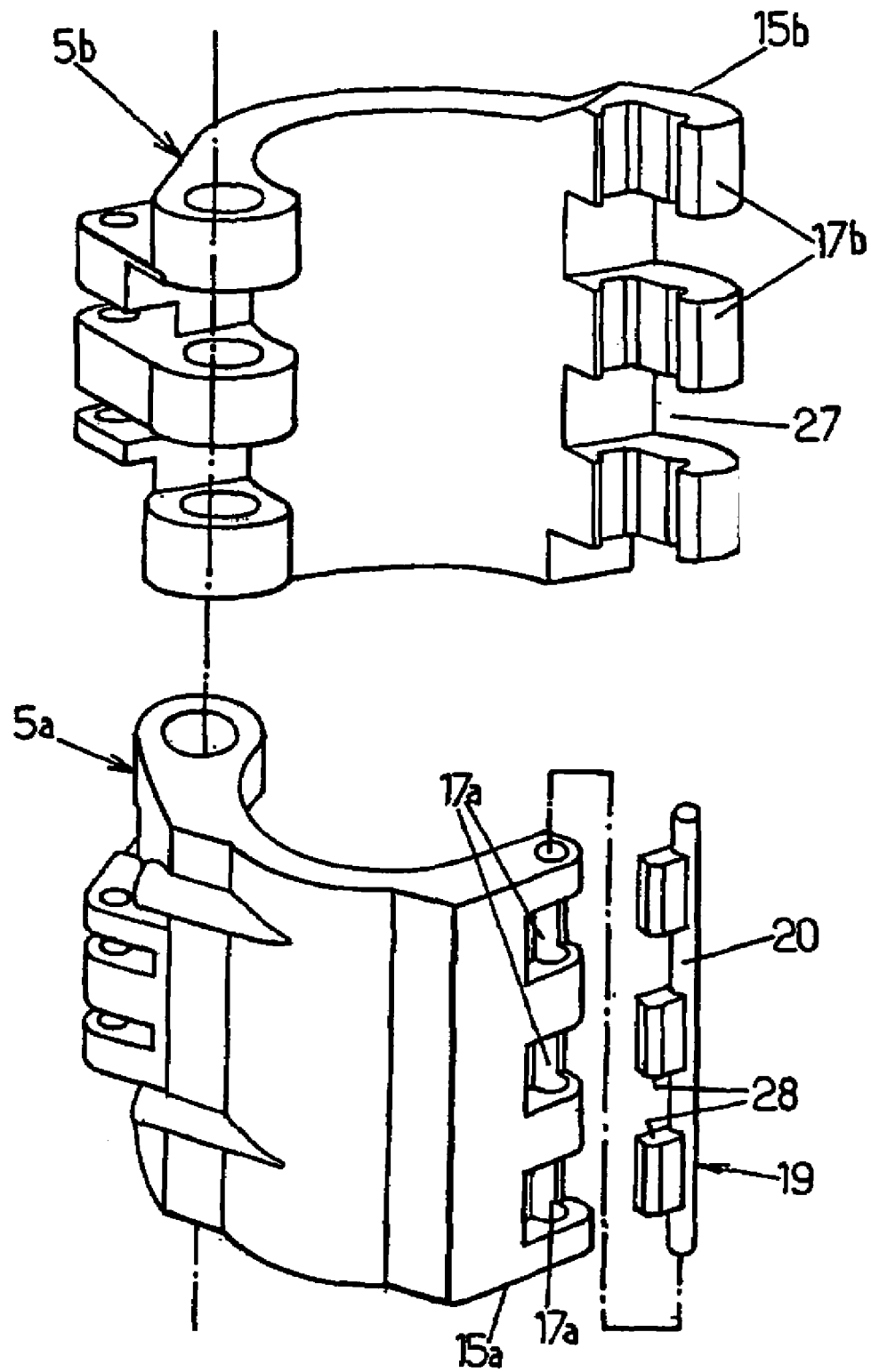
FIG. 4 is an exploded perspective view showing a further embodiment of the arrangements of the invention.

Only the mold carriers 5a and 5b and the gib 19 with its pin 20 are shown in FIG. 4 in an exploded view and in perspective. In this embodiment, the respective overlapping edges 15a and 15b of the two mold carriers 5a, 5b, in addition to the gib 19, are made in the form of discontinuous structures. As shown above, these structures extend over the entire height of the mold, such that, nevertheless, a relatively regular and continuous absorption of the forces over the entire height of the mold is obtained, although lightweight elements are used.

The overlapping edge 15b, located externally in the closed position of the mold, therefore comprises a plurality of superposed hooks 17b separated by intervals 27 of which the height has to remain limited; the individual design of each hook 17b remains identical to that of the single hook of the embodiments considered above.

Similarly, the gib 19 is made up of a succession of webs 28, having the same spacing as the hooks 17b, attached to the pin 20.

Finally, the overlapping edge 17a of the mold carrier 5a is itself also provided with a plurality of hooks 17a corresponding to the hooks 17b and the webs 28. In this embodiment, it may be provided that the intervals between the hooks are solid and drilled with a bore for the passage of the pin 20, as illustrated in FIG. 4.

It will be noted that, if required, certain elements of discontinuous structure which have just been disclosed may be functionally associated with elements of continuous structure. Thus, for example, the discontinuous hooks 17b of the overlapping edge 15b and the gib 19 with webs 28 may be associated with a continuous hook 17a.

The invention claimed is:

1. A molding device for producing containers by blow molding or stretch blow molding from preforms made of a heated thermoplastic, said device comprising at least one mold comprising at least two half-molds, mutually displaceable between an open position in which they are separated from one another and a closed position in which they are tightly pressed against one another by respective cooperating bearing faces, defining a joint plane, the two half-molds having at least two respective corresponding edges of their respective bearing faces which are radially designed in the form of two mutually overlapping edges with respective opposing mating faces in the closed position of the mold, locking means being functionally associated with said overlapping edges, wherein said locking means (14) are designed in the following manner:
   one of said overlapping edges located on the inside has a mating face (internal mating face) which terminates in a hook and which has a recess adjacent to the hook;
   the other of said overlapping edges located on the outside has a mating face (external mating face) which terminates in a hook and which has a recess adjacent to the hook;
   said respective hooks and recesses of said internal and external overlapping edges extend substantially over the entire height of the mold;
   a gib extending substantially over the entire height of the mold is mounted rotatably about a pin corresponding to one of its edges in one of said recesses and in contact with the respective hook; and
   drive means are functionally associated with said gib for pivoting about its pin between two extreme positions, whereby the gib may occupy two functional positions, namely:
   a position inserted into its mounting recess in which the gib does not engage the opposing recess of the other overlapping edge and allows a mutual relative displacement of the two half-molds (opening and closing of the mold); and
   a projecting position in which the gib is pivoted toward the outside of its mounting recess and—the two half-molds being in the closed position—engages in the opposing recess of the other overlapping edge such that, when the two half-molds are subjected to forces separating them from one another (pre-blow molding, blow molding), said gib is engaged with the two respective hooks of the two overlapping edges and mechanically holds the two half-molds.

2. The molding device as claimed in claim 1, in which the mold is of the jackknife type with the two half-molds mutually articulated in rotation on a shaft (8) substantially parallel to one side of the joint plane, and wherein said locking means are provided on the side of the mold opposing said shaft of the two half-molds.

3. The molding device as claimed in claim 1, in which each half-mold comprises a mold carrier to which is fixed internally a shell provided with a mold half-impression, the joint plane being defined by the two shells pressed against one another in the closed position of the mold, and wherein the locking means are supported by the two mold carriers.

4. The molding device as claimed in claim 1, wherein the gib is supported by said internal overlapping edge.

5. The molding device as claimed in claim 1, wherein the respective hooks of said two overlapping edges and the gib extend continuously, substantially over the entire height of the mold.

6. The molding device as claimed in claim 1, wherein the gib and at least the hook of the opposing overlapping edge extend discontinuously, substantially over the entire height of the mold.

7. The molding device as claimed in claim 1, wherein the gib is supported in rotation, on or by its pin, with radial play.

8. The molding device as claimed in claim 1, this device being of the carousel type and mobile in rotation, wherein the drive means functionally associated with the gib consist of at least one idler roller supported, by means of a return mechanism, by one end of a rotating shaft of the gib, said roller being capable of cooperating with a fixed guide cam arranged laterally on the rotating carousel.

9. The molding device as claimed in claim 8, wherein the drive means of the gib consist of a return spring capable of returning the gib into said inserted position thereof.

10. The molding device as claimed in claim 8, wherein the drive means of the gib consist of a return spring capable of returning the gib into said projecting position thereof.

* * * * *